Oct. 19, 1954    N. L. DAVIS    2,692,048
METHOD FOR SINK AND FLOAT MINERAL SEPARATION
Filed Sept. 25, 1950
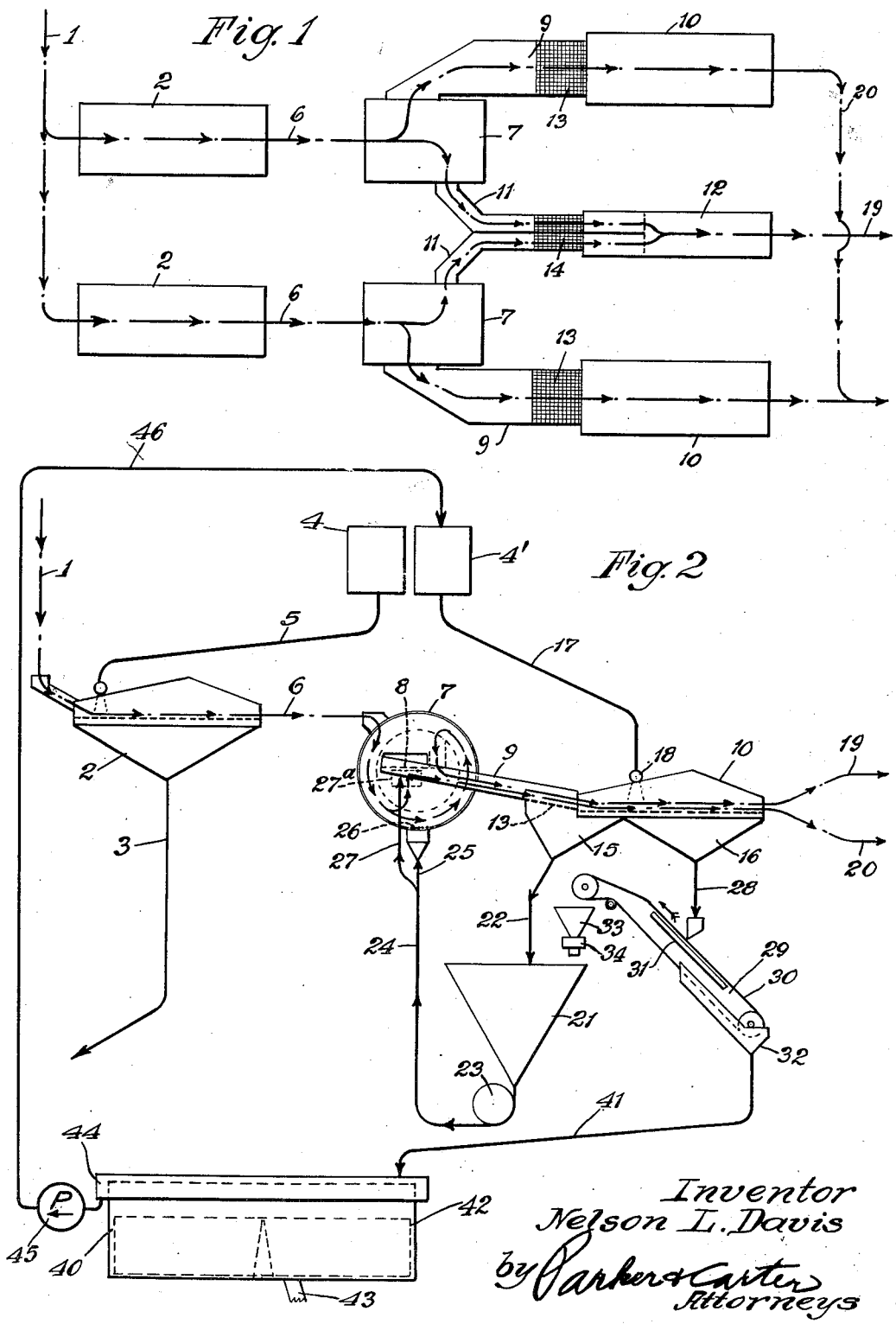
Inventor
Nelson L. Davis
by Parker & Carter
Attorneys

UNITED STATES PATENT OFFICE 2,692,048

METHOD FOR SINK AND FLOAT MINERAL SEPARATION

Nelson L. Davis, Chicago, Ill.

Application September 25, 1950, Serial No. 186,604

6 Claims. (Cl. 209—172.5)

My invention relates to improvements in means for controlling the density of the medium or bath in a float and sink mineral separation apparatus and process.

By sink and float separating method and process, I mean a method and apparatus where solids, such as coal or ore as it comes from the mine, are fed to a bath of liquid, the specific gravity of which is greater than some of the solids and less than others, so that the light solids may float on the surface and the heavy solids may sink to the bottom, the float and sink solids being separately discharged.

My invention is especially useful in the treating of coal, ore and the like, wherein the medium consists of water with finely divided magnetite, flue dust or other magnetizable media maintained in suspension therein by constant circulation.

Assuming a media of predetermined size and consistency the rate of sinkage in water may be established. In order that the effective specific gravity or density of the medium may be maintained constant, it is then necessary to first insure the use of the heavy media in the water at substantially constant particle size, to maintain a uniform amount or weight of media in the water and to circulate the water and media at a sufficiently rapid rate to insure that the media will remain in suspension in the water. The effective specific gravity of the medium may be set and controlled in consonance with the separation of float and sink solids desired. The lower the density of the medium the larger will be the proportion of the solids which will sink, so if it is desired to obtain coal for metallurgical purposes of the highest purity, the specific gravity might be set and held at 1.35. Under these circumstances only purer coal would float, everything else, including bone coal and contaminated coal, would sink. If, on the other hand, the object were to obtain coal where maximum purity was not essential, the specific gravity of the medium might be kept at 1.60. Under these circumstances all the pure coal would float and some of the coal which was ballasted with foreign matter, such as sulphur and the like, would sink in the first case, would now, because of the increased density of the medium, be recovered with the coal.

Thus, it is of the utmost importance that the specific gravity of the medium be accurately controlled and it is of equal importance that during the entire time of operation of the bath, the specific gravity or density remain constant without local or periodic changes in density.

After the sink and float separation has been accomplished in the vessel or bath, then the sink and float material is separately discharged. Usually the float material flows over a weir with some of the medium. Usually the sink material is mechanically raised above the level of the bath, partially drained, and then it is discharged. In any case, a certain amount of the medium leaves the vessel with both the sink and float material and so both the liquid and the media or suspension solids must be returned to the bath.

In order to recover not merely the media in suspension in the water as it leaves the vessel with the recovered solids but also to recover the media adhering to the solids and not drained off, it is customary to wash or rinse the discharged solids after they have been drained, the rinse water taking away from the solids the residual media and thus containing in great dilution, media which should be returned to the system.

In the past, it has been customary to discharge the medium drained off from the solids, together with the rinse or wash water into a large reservoir or settling tank where the diluted medium may be, by sedimentation or other treatment, concentrated for return with some water to the circulating system so as to maintain constant density.

This requires expensive installation, requires the pumping and storage of a relatively large amount of water, requires the provision of a relatively large amount of the expensive media not actually in use in the suspension and requires exceedingly careful control to insure that the concentrated medium recovered by sedimentation is returned to the system in consonance with the proper amount of water to give the desired constant density.

I propose to avoid all these difficulties by a constant and continuous circulation, by returning to the vessel where the separation takes place, all or substantially all of the withdrawn media, doing it as a part of a continuous process so that there is a continuous circulation of the liquid with the media in suspension.

To the extent that I return immediately to the circulation system, the water and media which leave the system with treated solids, to that extent I obviate the necessity of accurate control. If you put back in exactly the same amount of water and media as you take out, there can be no change in density. That is not one hundred percent possible but it is possible to closely approach this situation.

The solids introduced in the system contain inevitably a certain amount of fine material. As the solids pass through the system, degradation takes place and there is, therefore, added to the bath a continuing supply of fine, non-magnetic material which passes through the screen and is washed off the solids with the magnetite and returns to the circulating system. Means must be provided for removing these non-magnetic solids. To do this I propose to pass the rinse water, containing both magentic and non-magnetic solids, through a continuously operating magnetic separator. The magnetic separator will operate on a relatively dilute feed slurry which will always be uniform with respect to the liquid volume forwarded to the magnetic separator. The water carrying non-magnetic solids are discharged from the float and sink system, and a relatively thick concentration of magnetically recovered solids will be continuously returned to the system. The amount of water in the rinsing process is constant, the amount of water discharged with the non-magnetic solids from the magnetic separator is constant and the amount of water returning with the magnetically separated media is constant.

The amount of water permanently withdrawn from the system adhering to the float and sink materials discharged and the relatively small amount of media not rinsed off these materials may both be determined.

With all these factors in mind, it then becomes possible to determine just how much additional media must be added to the system and just how much additional water must be added to the system to maintain constant conditions and experience has taught that the amount of water and the amount of raw media needed may be accurately determined and the amount required by day by day operation is small enough so that easy, satisfactory operation may continue and the discharge of non-magnetic finely divided solids by the magnetic separator is sufficient to maintain the concentration of non-magnetic finely divided solids in the bath below the point at which they interfere with proper sink and float separation.

The magnetic concentrates are thus continuously recovered and returned to the pump sump at the same rate that they are removed from the surface of the float and sink products discharged from the float and sink bath. As a result, there is a substantially unvarying concentration of the media in the separating tank, and the specific gravity of the medium never changes by more than the amount of medium that escapes from the system with the float and sink products, or from the magnetic separator. Therefore, only that amount of media necessary to replenish the irrevocably lost media needs to be supplied.

The medium drained from the treated solids may be returned directly to the circulating system or may be returned to the circulating system through a magnetic separator. The same is true of medium recovered by the rinse water. The magnetic separator suitable for use with my invention is of a type which works best on a thin slurry and continuously recovers a highly concentrated magnetic media product for continuous and immediate return to the circulating system.

By my arrangement, therefore, substantially all of the medium, that is, the water with magnetic media in suspension, is continuously circulated through the system and only enough medium is kept in the system to completely fill it. There is no sedimentation tank and no delay while sedimentation takes place. There is no treatment of the magnetic media except by the magnetic separator, which inherently discards non-magnetic solids, recovers and at the same time densifies and returns the magnetic solids.

If desired, the feed slurry to the magnetic separator may be magnetized to assist the magnetic separator to recover magnetic solids. Such premagnetization is, however, not always essential.

If desired, the media discharged from the magnetic separator may be de-magnetized, as it is returned to the system.

To be sure, I do have a small sump below the separating vessel into which the medium flows and from which it is pumped back to the vessel. This sump, however, has nothing to do with the operation of the device when it is working, being, in effect, except when the plant is shut down, merely a part of the liquid conduit system. The purpose of the sump is to provide a sufficient capacity to hold the contents of the vessel and the circulating conduits when the power is turned off and the vessel stops work. The size or volumetric capacity of the sump and the vessel and the conduits is such that at the rate of discharge or flow through the vessel, there is a continuous flow of the medium. The pump circulates the medium through the system at a rate such that the entire liquid content of the system is replaced every two minutes or less and settling in the sump during operation is entirely prevented.

Other objects will appear from time to time throughout the specification and claims.

My invention is illustrated more or less diagrammatically in the accompanying drawings, wherein—

Figure 1 is a horizontal flow sheet; and

Figure 2 is a vertical flow sheet.

Like parts are indicated by like characters throughout the specification and drawings.

The details of the mechanisms themselves are indicated diagrammatically as the particular mechanisms are well-known in the art and form no part of my present invention.

1 indicates the raw coal supply. It may be a conveyor or a chute or any other desirable mechanism. This raw coal is discharged across pre-wet screens 2. These pre-wet screens eliminate from the system under-size solids which are adapted to be treated by other methods. For example, the screen will pass 0.25 inch, so only plus 0.25 inch material enters the float and sink system and minus 0.25 inch solids are discharged along the line 3 to any suitable point forming no part of the invention.

4 is a head tank, water being led from that tank along the conduit 5 to be sprayed on the coal as it passes over the upstream part of the pre-wet screen. The screens beyond the sprays dewater the raw material under such controlled conditions that the surface water carried into the separating system by the raw material will be constant and uniform throughout operation. As will hereafter appear, this is important because the relationship between the surface water on the solids leaving the system must be so controlled that more water leaves the system than enters it. The mixed coal and refuse in moistened though dewatered condition is discharged along the conduit 6 to the heavy medium processor 7, where the sink and float separation takes place. The float coal is discharged from the processor over the weir 8 and chute 9 to the float screen 10. The sink material raised from the bottom of the processor vessel is discharged via the chute 11 to the sink screen 12. In this case, I have illustrated two processors, two float screens, each one receiving the discharge from one of the processors and a sink screen which receives the refuse from both. Since in coal the amount of refuse is small in proportion to the amount of coal, this is a suitable arrangement. The chutes 9 and 11 are provided with fixed screens 13 and 14, the screens themselves being preferably vibratory screens. The fixed screens 13 and 14 and the upstream end of the vibratory screens are located over hoppers 15. The downstream ends of the screens 10 and 12 are located over hoppers 16. Water from the head tank 4' discharged through the conduits 17 is sprayed at 18 onto the sink and float material on the vibratory screens so that the drainage medium with media in suspension therein passes to the hoppers 15 and the rinse water, sprayed onto the solids after they have passed down the vibrating screens a short distance, passes into the hopper 16, carrying with it the media washed off the solids after drainage.

The final rejects, that is the sink material, passes out for discharge along the chute or conduit 19 and the coal is discharged along the conduit 20 as a clean product, both the reject and the coal having been washed so that they carry away from the system a minimum of adhering media and since the coal and refuse are drained before they are rinsed, the volume of water carried away from the main circulating system by the solids is slightly greater than the volume of water brought into the system with the solids from the pre-wet screens.

21 is a heavy medium sump. It receives medium from the hoppers 15, along the conduits 22 and the pump 23, withdraws the medium from the bottom of the sump, discharges it along the conduit 24, to the processor. The conduit 24 divides before it reaches the processor and 25 conducts medium toward the bottom of the processor where it is fed in through a diffuser plate 26 and the conduit 27 conducts some of the medium to the side of the processor where it is fed in over a diffuser plate 27a substantially at the surface of the bath but the medium fed by the pump to the processor is the same in character whether it goes in at the bottom or at the side.

The specific gravity of the medium drained off the coal is the same as that of the medium in the sump and in the processor. It merely circulates continuously through the system. The rinse water received in the hopper 16 contains media in suspension but the quantity is so small that the specific gravity of the rinse water is far below the specific gravity of the medium circulated in the system so that rinse water containing, as it does, a small amount of magnetite or other media and also containing fine dust, dirt, degradation products, etc., passes from the hopper 16 along the duct 28 to the magnetic separator 29. The magnetic separator in this case has a belt 30 moving in the direction of the arrows, immediately above a magnetized member 31. The water with media and refuse is discharged against this belt. The magnetic effect holds the media against the belt as the belt moves upwardly. The water and non-magnetic solids flow down the belt and are discharged from the hopper 32, the amount of water bearing such relationship to the water received by the magnetic separator that the magnetite which passes up over the belt and is discharged into the hopper 33 is a dense sludge. The discharge to the magnetic separator and the discharge from the bottom of the separator is very dilute but the recovered magnetite is relatively more dense than the medium circulating through the system. It discharges from the hopper 33 through demagnetizing coil 34 to the heavy media sump 21. Under some circumstances, the demagnetizing coil is not needed and the magnetic separator may discharge directly into the sump 21. If desired, in order to more rapidly get rid of non-magnetic solids, the discharge from the hopper 15 may also be fed to the magnetic separator. The magnetite in either case will be recovered. The non-magnetic fine solids will be discharged.

The system is thus a nominally closed system in so far as the suspension medium is concerned. The suspension medium circulates continuously either direct to the sump, the pump and the processor or by-passed through the magnetic separator. In either case, there is a constant flow of medium or water and media at a uniform rate of speed and there is no place in the system where flow is interrupted, or delayed, so the density of the medium will remain constant. The only exception to this being, of course, the very small amount of media which adheres to the coal and refuse and is carried out of the system and that lost in the discharge product of the magnetic separator. Since this depends on the character and size of the coal and since the character and size of the coal does not normally vary, this amount can easily be determined and it is only necessary to add additional magnetite to the system in consonance with this rate of wastage. Since the feed coal is pre-wet and then dewatered before entering the processor, but only drained and not dewatered until after being rinsed, water is removed on the surface of the float and sink products at a greater rate than entered with the feed to the processor. Therefore, the effect is one which always requires water to be replenished to the medium to hold its density constant. Thus, I am able to have a continuously operating device wherein the specific gravity or density of the medium may be set and controlled and remain constant during the operation of the apparatus.

The liquid from the magnetic separator 32 discharges through the pipe 41 to the clarifying basin 40. The water fed to the clarifying basin 40 from the pre-watering screen contains finely divided solids, small enough to pass through the screen. The water discharged from the magnetic separator contains degradation products from the system mostly non-magnetic though, of course, there is always the possibility of escape of some of the fine magnetic solids washed off the coal and refuse discharged from the float vessel. These solids settled to the bottom of the tank are collected in the usual manner by any suitable collecting means indicated in dotted lines as 42 and are discharged through the passage 43 to waste or to other treatment means forming no part of this invention. The clarified water overflows in the usual manner into the hopper 44, is returned by the pump 45 through the conduit 46 to the head tank 4'.

Thus there are two separate nominally closed liquid circulating systems, one including the vessel, the sump, the pump and the associated conduits through which the flotation medium is circulated, the other, the water system including the head tank, the sprays, the run off from the dewatering screens 2 and from the magnetic separator 32 so that there is a continuous circulation and clarification of water to and through the head tank.

The cooperation of these two circulating systems is of the utmost importance. If, for example, less water is removed from the medium in circulation than is brought to it on the surface of the pre-wet feed material, a diluting effect results. To compensate, it would be necessary to be continually adding make-up magnetite to hold the density at constant level. The liquid volume contained in the system would always be expanding and the result would, of course, be intolerable.

Also, if we only remove from the medium an equal amount of water to that entering it on the surface of the feed material from the pre-wet screen, then under these circumstances, the balance would be so closely drawn that the difficulty outlined above might be experienced. This, therefore, is also an unsatisfactory condition.

The only permissible condition is that where more surface moisture is removed from the medium than enters with the feed from the pre-wet screen. With our flow sheet this is obviously the case since the length of the pre-wet screen beyond the wetting sprays is used for the purpose of dewatering the feed. As the float and sink products are removed from the bath in the processor, the same opportunity for efficient dewatering does not exist prior to the point of reading the rinsing sprays. In other words, drainage of the surface moisture is less complete at this point of travel than at the discharge end of the pre-wet screen. This, then, results in a condition where more surface moisture is removed from the medium than is discharged to it and this results in a shrinkage of volume for the medium in circulation, which must be replenished by make-up water. Since the dense concentrates from the magnetic separator also contain some water, the net amount of make-up water needed results from the equation:

Exit H₂O−entering H₂O=H₂O in magnetic separator concentrates+make-up water

From this it can be seen that if the make-up water should have become a minus quantity we would be in serious trouble because we would need to be continually adding make-up magnetite to prevent the sump medium from being diluted. This would result in the expansion of liquid volume which would defeat our purpose.

The surface moisture contained on the dewatered float and sink products at the discharge end of the rinse and drainage screens should be approximately equal to the surface moisture contained on the feed material discharged from the pre-wet screen. The only effect of this is in connection with the amount of make-up water required for the circuit between the head tank 4' and the clarified water from magnetic separator discharge hopper 32 which is returned to the head tank 4' in closed circuit.

I have diagrammatically illustrated a magnetic separator. Any type is suitable which will effect a continuous separation of the magnetite from the water and solids and return this directly to the system.

The sump 21, while big enough to hold the entire capacity of the system when the system is closed down and no water is circulating, is practically empty during operation so that there is a continuous flow to and through the sump and the sump merely acts as a conduit for such continuous flow.

I have not illustrated any particular mechanism for adding the small amount of magnetite needed to compensate for that which finally escapes from the system nor have I illustrated any particular mechanism for adding the small amount of water necessary to keep the system filled for operation, since the details of these form no part of my invention.

While the dewatering screen operates mechanically to feed raw solids to the bath with a generally uniform amount of surface moisture, it will be obvious that the actual volume or weight of surface moisture fed to the bath with the raw material in any given increment of time will vary in consonance with variation in the size of the particles.

The smaller the particles, the larger the superficial area per pound or ton of the raw material and the more surface water carried in with the solids. The dewatering screen mechanically removes this surface moisture to the point that the amount of moisture on the surface of each particle is generally uniform.

Also when the solids are discharged from the bath, the actual volume of surface water varies in exactly the same way in consonance with the size of the particles but since the particles travel through the bath at a very high rate of speed, perhaps only a few seconds being required for the particles to enter the bath, be gravitationally separated and discharged, the conditions both at the intake and at the discharge with respect to the amount of moisture are generally uniform.

It is conceivable that in any given small increment of time there might be a wide range of variation. For a few seconds or even for a minute most of the coal might be in very large pieces. Then suddenly in the next few seconds or minutes, the coal might be all in small pieces. Under these circumstances there would be a considerable change in the amount of moisture entering in and taken from the bath but that change is in consonance with this change in size of particles. It is a fact that in any long period of time the sizes of the particles average out but it is essential that the bath density remain constant. It is not sufficient that it average out over a long period of time. It must remain constant at all times and my arrangement whereby I introduce a controlled percentage of surface moisture and discharge from the bath the solids with a controlled percentage of surface moisture somewhat greater than that percentage which entered, makes it possible for me to maintain long average densities over a long period of time but substantially constant density at all periods of time because of the immediate return to the bath after the screening and draining and also after the magnetic separation of the magnetite drained off and rinsed off of the individual particles. This would not be possible were I to use in the system a densifier or a clarifier or any other means which retained the magnetite for a continuous time consuming treatment and therefore one of the most important elements in my invention is the fact that the medium drained from the solids is immediately returned for circulation in the bath and the medium rinsed from the solids is immediately and continuously concentrated by the magnetic separator and immediately returned for recirculation in the bath.

The use and operation of my invention are as follows:

The achievement of a float and sink separation for minerals such as coal has been successfully accomplished by using dense media suspension in water. Such suspensions will hereinafter be referred to as the bath. The result is that particles having a less density than the bath will float while those having a greater density will sink.

One of the practical problems incidental to the commercial use of such a float and sink process is that of maintaining the bath at constant density. For example, consider the case of treating raw coal ranging in size between the limits of 10" and ¼". The average size of the particles will vary from minute to minute and so the exposed surface area of the feed material constantly varies between wide limits, yet, over the period of perhaps one hour, the average surface area is closely equal to the average surface area of feed material during any other hour. Therefore, the density of the bath must be controlled on a minute to minute rather than on an hour to hour basis.

The feed material enters the bath with water on its exposed surfaces. It will, when removed from the bath, retain on those surfaces both liquid and suspended solids. In other words, it will remove from the bath ingredients which were not present when the feed entered the bath and the rate of such removal varies in proportion to the extent of variation of surface area.

The drawing, a flow sheet, shows diagrammatically the operation of my invention. Bearing in mind that the two ingredients of the bath are water and solids, it will be clearly apparent that water and solids removed from the bath on the surface of the float and sink products must be returned to the bath in equal amount and at an equivalent rate to that of their removal if the density of the bath is to be kept constant.

First, consider the one ingredient—water. To establish a uniform average of surface moisture of raw feed coal entering the bath, the coal is first wet with sprays of water and is then mechanically dewatered by means of a prewetting and dewatering screen. After immersion in the bath, the float and sink solids are evacuated and drained. Freely draining water is returned immediately to the bath but before mechanical dewatering has been accomplished over the drainage screen to the extent that it was accomplished with the prewet screen. It is, therefore, established that less water will be restored to the bath than was present on the feed material entering the bath.

Next, consider the solids. We are only concerned with solids that are magnetically susceptible because my bath is comprised of water and magnetically susceptible solids. Since no magnetic solids are on the surface of the raw feed coal entering the bath but are retained on the surface of the float and sink solids leaving the bath, there are only two channels through which such magnetic solids can be recovered and restored to the bath. The first of these channels may be considered as the liquid which drains freely from the float and sink solids and which returns directly to the sump for immediate recirculation. These liquids are essentially of the same density as the bath liquid. The second channel consists of the rinsing of the float and sink products after they have traveled beyond the zone where free drainage occurs. Here, water is used for rinsing purposes and the magnetic solids thus recovered must first be separated from water and any non-magnetic solids present by means of a magnet. The magnetic concentrates are discharged continuously and this may be followed if desired by demagnetization before being returned to the bath through the sump. Here it is pointed out that the rate of reclamation of magnetic solids by rinsing is a variable that is a function of the surface area of the float and sink products. Since the bath density must be maintained as a constant, it will be clearly evident that this can only be accomplished if the magnetic solids recovered by rinsing and magnetic attraction are returned to the bath without any loss of time subsequent to their removal from the bath. The longer elapsed time between removal and return the greater the variation of bath density, which is an intolerable operating condition.

Previous attempts to solve this problem have all utilized facilities which resulted in a time lag of one hour or more between the time solids are removed from the bath and returned to it. My invention permits this time interval to be reduced to less than one minute and the facilities involved are simplified to the extent that only a magnetic separator is involved of a type which will also discharge magnetic concentrates having a density materially greater than the density of the bath. Thus, it is always necessary for the operator to add water which is lost in the circuit and never necessary to add magnetite to offset the return of a concentrate which is of less density than the bath, or of less amount than is continuously being removed from the bath.

It is, of course, understood that the system continuously loses a certain amount of magnetite because its efficiency of recovery is not one hundred percent but the amount of magnetite replenished needs only to be equal to that lost due to something less than one hundred percent efficiency of recovery.

I claim:

1. The method of sink and float separation which consists in, screening wet raw solids to eliminate the fines, dewatering the raw solids to a uniform amount of surface moisture, treating the solids in a bath containing a suspension medium consisting of water and finely divided magnetic media circulated to, through and from the bath at such rate that the media remain in suspension, separately withdrawing the sink and float solids from the bath with some of the medium, screening the solids and returning, for immediate circulation through the bath, the medium drained from the solids, the screening leaving the solids with more surface moisture than was on them when they entered the bath, rinsing the drained solids, dewatering them and subjecting the resultant thin slurry without any additional treatment directly to magnetic separation, recovering and returning the magnetic media with a relatively small amount of water as a thick concentrate directly without any treatment other than magnetic separation to the bath circulating system.

2. The method of sink and float separation which consists in, screening wet raw solids to eliminate the fines, dewatering the raw solids to a uniform amount of surface moisture, treating the solids in a bath containing a suspension medium consisting of water and finely divided magnetic media circulated to, through and from the bath at such rate that the media remain in suspension, separately withdrawing the sink and float solids from the bath with some of the medium, screening the solids and returning, for immediate circulation through the bath, the medium drained from the solids, the screening leaving the solids with more surface moisture than was on them when they entered the bath, rinsing the drained solids, dewatering them and subjecting the resultant thin slurry without any additional treatment, directly to magnetic separation, recovering and returning the magnetic media with a relatively small amount of water as a thick concentrate directly without any treatment other than magnetic separation to the bath circulating system, clarifying the water discharged from the magnetic separator and reusing the clarified water to rinse the solids.

3. The method of sink and float separation which consists in, screening wet raw solids to eliminate the fines, dewatering the raw solids to a uniform amount of surface moisture, treating the solids in a bath containing a suspension medium consisting of water and finely divided magnetic media circulated to, through and from the bath at such rate that the media remain in suspension, separately withdrawing the sink and float solids from the bath with some of the medium, screening the solids and returning, for immediate circulation through the bath, the medium drained from the solids, the screening leaving the solids with more surface moisture than was on them when they entered the bath, rinsing the drained solids, dewatering them and subjecting the resultant thin slurry without any additional treatment, directly to magnetic separation, demagnetizing and returning the magnetic media with a relatively small amount of water as a thick concentrate directly without any treatment other than magnetic separation and subsequent de-magnetization to the bath circulating system.

4. The method of sink and float separation which consists in, screening wet raw solids to eliminate the fines, dewatering the raw solids to a uniform amount of surface moisture, treating the solids in a bath containing a suspension medium consisting of water and finely divided magnetic media circulated to, through and from the bath at such rate that the media remain in suspension, separately withdrawing the sink and float solids from the bath with some of the medium, screening the solids and returning, for immediate circulation through the bath, the medium drained from the solids, the screening leaving the solids with more surface moisture than was on them when they entered the bath, rinsing the drained solids, dewatering them and subjecting the resultant thin slurry without any additional treatment, directly to magnetic separation, recovering the magnetic media, demagnetizing and returning them with a relatively small amount of water as a thick concentrate directly without any treatment other than magnetic separation and subsequent de-magnetization to the bath circulating system, clarifying the water discharged from the magnetic separator and reusing the clarified water to rinse the solids.

5. The method of sink and float separation which consists in rinsing and screening raw solids to eliminate the fines, dewatering the raw solids to a uniform amount of surface moisture, treating the solids in a bath containing a suspension medium consisting of water and finely divided magnetic media circulated to, through and from the bath at such rate that the media remain in suspension, separately withdrawing the sink and float solids from the bath with some of the medium, screening the solids and returning, for immediate circulation through the bath, the medium drained from the solids, the screening leaving the solids with more surface moisture than was on them when they entered the bath, rinsing the drained solids, dewatering them and subjecting the resultant thin slurry without any additional treatment, directly to magnetic separation, recovering and returning the magnetic media with a relatively small amount of water as a thick concentrate directly without any treatment other than magnetic separation to the bath circulating system.

6. The method of sink and float separation which consists in, rinsing and screening raw solids to eliminate the fines, dewatering the raw solids to a uniform amount of surface moisture, treating the solids in a bath containing a suspension medium consisting of water and finely divided magnetic media circulated to, through and from the bath at such rate that the media remain in suspension, separately withdrawing the sink and float solids from the bath with some of the medium, screening the solids and returning, for immediate circulation through the bath, the medium drained from the solids, the screening leaving the solids with more surface moisture than was on them when they entered the bath, rinsing the drained solids, dewatering them and subjecting the resultant thin slurry without any additional treatment, directly to magnetic separation, recovering and returning the magnetic media with a relatively small amount of water as a thick concentrate directly without any treatment other than magnetic separation to the bath circulating system, clarifying the water discharged from the magnetic separator, and reusing the clarified water to rinse the solids.

References Cited in the file of this patent

UNITED STATES PATENTS

| Number | Name | Date |
|---|---|---|
| 2,135,957 | Wwensch | Nov. 8, 1938 |
| 2,151,175 | Wwensch | Mar. 21, 1939 |
| 2,206,980 | Wade | July 9, 1940 |
| 2,325,149 | Rakowsky | July 27, 1943 |
| 2,387,866 | Walker | Oct. 30, 1945 |
| 2,490,365 | Lowe | Dec. 6, 1949 |
| 2,496,590 | Marsh | Feb. 7, 1950 |

OTHER REFERENCES

Mesabi Range Changes Heavy Media Practice, by E. C. Betzer, Mining Congress Journal, June 1947, pages 36, 37, 38 and 39.

Heavy Media Separation Process-Ore Pressing Notes, American Cyanamid Corp., July 1942, pages 18 to 24.

The Evolution of Cleaning Coal with Dense Media, Nelson L. Davis Co. Copyright 1951; pages 11 and 12.